(12) United States Patent
Suzuki et al.

(10) Patent No.: US 8,715,854 B2
(45) Date of Patent: May 6, 2014

(54) ACTIVE MATERIAL WITH A SURFACE-MODIFIED LAYER COVERING A METAL OXIDE CORE AND AN ELECTRODE AND BATTERY COMPRISING THE SAME

(75) Inventors: Hisashi Suzuki, Tokyo (JP); Masato Kurihara, Tokyo (JP); Yoshitomo Tanaka, Tokyo (JP); Hiroshi Chihara, Tokyo (JP); Yoshinori Fujikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 63 days.

(21) Appl. No.: 11/889,832

(22) Filed: Aug. 16, 2007

(65) Prior Publication Data

US 2008/0044727 A1 Feb. 21, 2008

(30) Foreign Application Priority Data

Aug. 17, 2006 (JP) .................................. 2006-222671

(51) Int. Cl.
*H01M 4/1315* (2010.01)
*H01M 4/13915* (2010.01)
(52) U.S. Cl.
USPC ...................................... 429/218.1; 29/623.5
(58) Field of Classification Search
USPC ....................... 429/122–347; 29/623.1–623.5
See application file for complete search history.

(56) References Cited

U.S. PATENT DOCUMENTS

| | | | |
|---|---|---|---|
| 6,395,426 B1 | 5/2002 | Imachi et al. | |
| 6,458,487 B1 | 10/2002 | Takeuchi et al. | |
| 6,730,435 B1 * | 5/2004 | Nakane et al. | 429/218.1 |
| 2001/0031397 A1 * | 10/2001 | Kweon et al. | 429/218.1 |
| 2004/0091779 A1 * | 5/2004 | Kang et al. | 429/231.1 |
| 2004/0201948 A1 | 10/2004 | Hosoya et al. | |
| 2005/0019662 A1 * | 1/2005 | Suhara et al. | 429/231.95 |

FOREIGN PATENT DOCUMENTS

| | | |
|---|---|---|
| CN | 1253389 | 5/2000 |
| CN | 1731605 A | 2/2006 |
| JP | A-2001-6676 | 1/2001 |
| JP | A 2003-242976 | 8/2003 |
| JP | A-2004-319105 | 11/2004 |
| JP | A-2005-310744 | 11/2005 |
| JP | A 2006-107763 | 4/2006 |
| WO | WO 99/05734 | 2/1999 |

OTHER PUBLICATIONS

Yabuuchi, Naoaki et al., "Novel Lithium Insertion Material of $LiCo_{1/3}Ni_{1/3}Mn_{1/3}O_2$ For Advanced Lithium-Ion Batteries," Journal of Power Sources, vol. 119-121, pp. 171-174, 2003.

(Continued)

*Primary Examiner* — Basia Ridley
*Assistant Examiner* — Jonathan G Leong
(74) *Attorney, Agent, or Firm* — Oliff PLC

(57) ABSTRACT

An active material with a sufficient cycle characteristic and a process for its production are provided. According to the process for production of an active material of this invention, an aqueous solution containing a metal fluorocomplex is contacted with a metal oxide to form a surface-modified layer on the surface of the metal oxide. The active material of the invention comprises a core section made of a metal oxide and a surface-modified layer covering the core section, wherein the surface-modified layer is an oxide containing a metal present in the core section and a metal not present in the core section.

11 Claims, 6 Drawing Sheets

(56) References Cited

OTHER PUBLICATIONS

Notification of First Office Action for Chinese Patent Application No. 200710146511.4; mailed Mar. 12, 2010.

English-language translation of Feb. 24, 2012 Notification of First Office Action issued in Chinese Application No. 201010234823.2.

\* cited by examiner

Fig.3

| | Active material | Metal fluorocomplex | Surface modifying element | Heat treatment temperature [°C] | Mean modified layer thickness [nm] | Maximum charging voltage [V] | Capacity after 300 cycles with respect to initial capacity [%] | Battery cycle test temperature [°C] |
|---|---|---|---|---|---|---|---|---|
| Example A1 | LiCo$_{1/3}$Ni$_{1/3}$Mn$_{1/3}$O$_2$ | (NH$_4$)$_2$TiF$_6$ | Ti | 100 | 20 | 4.5 | 84 | 25 |
| Example A2 | LiCo$_{1/3}$Ni$_{1/3}$Mn$_{1/3}$O$_2$ | (NH$_4$)$_2$TiF$_6$ | Ti | 500 | 20 | 4.5 | 85 | 25 |
| Example A3 | LiCo$_{1/3}$Ni$_{1/3}$Mn$_{1/3}$O$_2$ | (NH$_4$)$_2$TiF$_6$ | Ti | 700 | 20 | 4.5 | 85 | 25 |
| Example A4 | LiCo$_{1/3}$Ni$_{1/3}$Mn$_{1/3}$O$_2$ | (NH$_4$)$_2$TiF$_6$ | Ti | 900 | 20 | 4.5 | 85 | 25 |
| Example A5 | LiCo$_{1/3}$Ni$_{1/3}$Mn$_{1/3}$O$_2$ | H$_2$TiF$_6$ | Ti | 900 | 20 | 4.5 | 85 | 25 |
| Comp. Ex. A1 | LiCo$_{1/3}$Ni$_{1/3}$Mn$_{1/3}$O$_2$ | - | None | - | - | 4.5 | 75 | 25 |
| Example A6 | LiCo$_{1/3}$Ni$_{1/3}$Mn$_{1/3}$O$_2$ | (NH$_4$)$_2$TiF$_6$ | Ti | 900 | 20 | 4.2 | 92 | 25 |
| Comp. Ex. A2 | LiCo$_{1/3}$Ni$_{1/3}$Mn$_{1/3}$O$_2$ | - | None | - | - | 4.2 | 80 | 25 |
| Example B1 | LiMn$_2$O$_4$ | ZnF$_2$·4H$_2$O | Zn | 900 | 20 | 4.2 | 84 | 55 |
| Comp. Ex. B1 | LiMn$_2$O$_4$ | - | None | - | - | 4.2 | 70 | 55 |

*Fig.4*

| | Content (wt%) | | | | | | | |
|---|---|---|---|---|---|---|---|---|
| | Si | Ti | Zr | In | Sn | F | Balance | Total |
| Example A1 | 0.024 | 0.137 | 0.000 | 0.000 | 0.000 | 0.0053 | 99.83 | 100.000 |

*Fig.5*

| | Content (mol%) | | | | | | | |
|---|---|---|---|---|---|---|---|---|
| | Si | Ti | Zr | In | Sn | F | Balance | Total |
| Example A1 | 0.081 | 0.275 | 0.000 | 0.000 | 0.000 | 0.027 | 99.62 | 100.000 |

ACTIVE MATERIAL WITH A SURFACE-MODIFIED LAYER COVERING A METAL OXIDE CORE AND AN ELECTRODE AND BATTERY COMPRISING THE SAME

BACKGROUND OF THE INVENTION

1. Field of the Invention

The present invention relates to a process for production of an active material and an electrode which are used for chargeable electrochemical elements such as lithium ion secondary batteries and electrical double layer capacitors, as well as to an active material and an electrode that is produced by the process.

2. Related Background Art

Electrochemical elements such as chargeable lithium ion secondary batteries, electrical double layer capacitors (EDLC) and the like are widely used in cellular phones, laptop computers and PDAs. The main positive electrode active substances of lithium ion secondary batteries are $LiCoO_2$, $LiNi_xCo_{1-x}O_2$, $LiMn_2O_4$ and $LiCo_xNi_yMn_{1-x-y}O_2$. Negative electrode active materials that have been used or researched to date include, primarily, carbonaceous materials such as artificial graphite, natural graphite, mesocarbon microbeads (MCMB), coke, fibrous carbon and the like. The charging voltage limit for batteries comprising combinations of positive electrode active materials and negative electrode active materials is 4.1-4.2V, and the energy density is 400-500 Wh/L at the large end.

In recent years, energy consumption by devices has increased, raising the level of energy density desired for batteries. However, it has reached a point where further increase in energy density is difficult to achieve by optimization of battery design (for example, reducing the thickness of the container housing the elements of the battery or reducing the thickness of the positive electrode/negative electrode collector).

One method for achieving higher energy density is to employ a positive electrode active material that utilizes the capacity of areas with higher potential than the potential in regions conventionally used for charge and discharge. In other words, it is attempted to increase the charging voltage of the battery for higher energy density. $LiCo_xNi_yMn_{1-x-y}O_2$ permits higher energy density since it allows the discharge capacity to be increased through a higher charging voltage (up to 4.6 V vs $Li/Li^+$) than conventional (4.2 V-4.3 V vs $Li/Li^+$). The following disclosures exist regarding active materials that allow charging at high voltage.

N. Yabuuchi and T. Ohzuku (Novel lithium insertion material of $LiCo_{1/3}Ni_{1/3}Mn_{1/3}O_2$ for advanced lithium-ion batteries, Journal of Power Sources, vol. 119-121, p 171-174 (2003)) discloses $LiCo_{1/3}Ni_{1/3}Mn_{1/3}O_2$ as a positive electrode active material. For example, Japanese Unexamined Patent Publication No. 2003-242976 also discloses a process for producing a positive electrode active material for a lithium secondary battery, represented by the general formula $Li_pNi_xCo_yMn_zO_r$ (where $0.9 \leq p \leq 1.3$, $0.2 \leq x \leq 0.5$, $0.20 < y < 0.40$, $0.2 \leq z \leq 0.5$, $0.8 \leq x+y+z \leq 1$, $1 \leq r \leq 2$), the positive electrode active material for a lithium secondary battery (according to claim 19) being characterized in that a combination of a lithium compound with a complex oxide having the general formula $Ni_xCo_yMn_zO_r$ (where p, x, y, z and r are the same as above) and an specific surface of 10-150 $m^2/g$, is fired at 600-1000° C. in an oxygen-containing atmosphere. A battery constructed using a positive electrode active material produced by this process is described as having excellent initial capacity, initial charge-discharge efficiency, charge-discharge cycle durability and safety.

Japanese Unexamined Patent Publication No. 2006-107763 describes a process for producing iron oxyhydroxide as an example of applying the process known as liquid phase deposition for batteries, as well as a non-aqueous electrolyte electrochemical cell provided with an electrode comprising the same. In a process for production of iron oxyhydroxide for a non-aqueous electrolyte electrochemical cell, an iron fluorocomplex is reacted with boric acid in aqueous solution. In a process for production of an active material for a non-aqueous electrolyte electrochemical cell, an aqueous solution containing an iron fluorocomplex and boric acid is contacted with carbon powder to form iron oxyhydroxide on carbon powder. An aqueous solution containing an iron fluorocomplex and boric acid is also contacted with a collector base to form iron oxyhydroxide on the collector base. Also used in a non-aqueous electrolyte electrochemical cell is an electrode containing iron oxyhydroxide produced by such a process.

SUMMARY OF THE INVENTION

Nevertheless, it has not been possible to achieve a satisfactory cycle characteristic with conventional active materials, and in particular the charge-discharge cycle characteristic is significantly impaired with high-voltage charging. While the reason for this is not clear, it is conjectured that the electrolyte solution decomposes on the surface of the positive electrode active material, producing a high-resistance film. Even without charging at high voltage, it is still desirable to use an active material with an even more satisfactory charge-discharge cycle characteristic.

The present invention has been accomplished with these problems in mind, and its object is to provide an active material and electrode with a satisfactory charge-discharge cycle characteristic, as well as a process for their production.

Beginning from this point, the present inventors discovered a process whereby the charge-discharge cycle characteristic can be improved over the prior art by modifying the surface of the metal oxide active material. According to the process, the active material is immersed in a metal fluorocomplex aqueous solution to form a solid solution layer on the active material surface.

Specifically, the process for production of an active material according to the invention comprises contacting a metal fluorocomplex-containing aqueous solution with a metal oxide to form a surface-modified layer on the surface of the metal oxide.

The process for production of an electrode according to the invention comprises contacting a metal fluorocomplex-containing aqueous solution with an electrode provided with an active material layer comprising a metal oxide, a conductive aid and a binder to form a surface-modified layer on the surface of the metal oxide.

Electrochemical devices employing the active material and electrode obtained according to the invention exhibit superior charge-discharge cycle characteristics compared to the prior art. While the reason for this is not fully understood, it is believed that formation of a surface-modified layer on the surface of the metal oxide as an active material leads to supress decomposition of the electrolyte solution and electrolyte and breakdown of the active material crystals, thereby improving the thermostability of the active material. This allows satisfactory charging to be accomplished with oxides containing Li and at least one metal selected from the group consisting of Co, Ni and Mn (for example, $LiCo_xNi_yMn_{1-x-y}O_2$), at a higher voltage than the prior art, so that the volume energy density can be increased.

The metal fluorocomplex is preferably at least one selected from the group consisting of fluorotitanic acid, fluorotitanic acid salts and zinc fluoride. This will provide an effect whereby the metal ion in the compound dissolves satisfactorily on the surface of the active material.

The aqueous solution containing the metal fluorocomplex preferably further comprises a scavenger that chemically scavenges fluoride ion from the metal fluorocomplex. This can further promote surface modification.

Boric acid and aluminum may be mentioned as scavengers.

The metal oxide is most preferably a lithium-containing metal oxide. Such oxides allow satisfactory cycle characteristics to be exhibited even with charging at 4.5 V, which is a very high voltage compared to the voltage usually permitted in the prior art.

The metal oxide is preferably $LiCo_xNi_yMn_{1-x-y}O_2$ (where x and y are greater than 0 and less than 1), and the metal fluorocomplex is preferably fluorotitanic acid and/or a fluorotitanic acid salt. Also preferred are the metal oxide $LiMn_2O_4$ and the metal fluorocomplex zinc fluoride. Such combinations form very satisfactory solid solutions.

The active material of the invention is provided with a core section made of a metal oxide and a surface-modified layer covering the core section, wherein the surface-modified layer is an oxide containing a metal present in the core section and a metal not present in the core section.

Such active materials are formed by the process described above.

The metal not present in the core section is preferably at least one selected from the group consisting of titanium and zinc. Such active materials can be obtained using the metal fluorocomplexes mentioned above.

The metal oxide is preferably a lithium-containing metal oxide. A lithium ion secondary battery employing such an active material as the positive electrode active material has a particularly high cycle characteristic even with high voltage charging at about 4.5 V.

The content of the metal not present in the core section is preferably 0.01 mol %-10 mol % with respect to the entire active material. The number of moles of the entire active material is calculated as (sum of the numbers of moles of each element not present in the core section+(total weight of elements other than those not present in the core section/molecular weight of the active material in the core section)). The effect of improved cycle characteristic may not be achieved below this lower limit, while the capacity will be reduced above the lower limit.

The metal oxide of the core section is an oxide including at least one selected from the group consisting of Co, Ni and Mn, and the content of metals of the surface-modified layer not present in the core section is preferably 0.1 mol %-70 mol % with respect to the total number of moles of Co, Ni and Mn in the surface-modified layer and metals in the surface-modified layer that are not present in the core section, or in other words: (number of moles of metals not present in core section)/(total number of moles of metals not present in core section+Co and Ni and Mn in surface-modified layer)×100=0.1-70 mol %.

The effect of improved cycle characteristic may not be achieved below this lower limit, while the capacity will be reduced above the lower limit.

The surface-modified layer preferably further contains fluorine. This will confer an advantage of conductivity to the active material.

The thickness of the surface-modified layer is preferably 1 nm-200 nm. The effect of improved cycle characteristic may not be achieved below this lower limit, while the capacity will tend to be reduced above the lower limit.

The electrode of the invention is an electrode comprising the aforementioned active material.

Based on research by the present inventors, it was found that selecting appropriate combinations of the metal oxide material for the core section and the type of metal in the metal fluorocomplex when carrying out the invention can yield a highly satisfactory surface-modified layer on the active material surface.

For example, when the metal oxide of the core section is $LiCo_xNi_yMn_{1-x-y}O_2$ (where x and y are greater than 0 and less than 1), the metal of the surface-modified layer that is not present in the core section is preferably titanium, and when the metal oxide of the core section is $LiMn_2O_4$, the metal of the surface-modified layer that is not present in the core section is preferably zinc. These two combinations can form a desirable modified layer on the active material surface. While the mechanism of the reaction that contributes to optimization of this combination is not completely understood, it is thought that the structural configuration is dependent on the ion radius of the metal in the metal fluorocomplex, and on the pH.

EFFECT OF THE INVENTION

There are provided an active material and electrode that exhibit sufficient cycle characteristics, as well as process for their production.

BRIEF DESCRIPTION OF THE DRAWINGS

FIG. 3 is a table showing the conditions and results for Examples A1-A6, B1 and Comparative Examples A1, A2 and B1.

FIG. 4 shows results for compositional analysis (weight) of the active material obtained in Example A1.

FIG. 5 shows results for compositional analysis (moles) of the active material obtained in Example A1.

DESCRIPTION OF THE PREFERRED EMBODIMENTS

Figure 1:
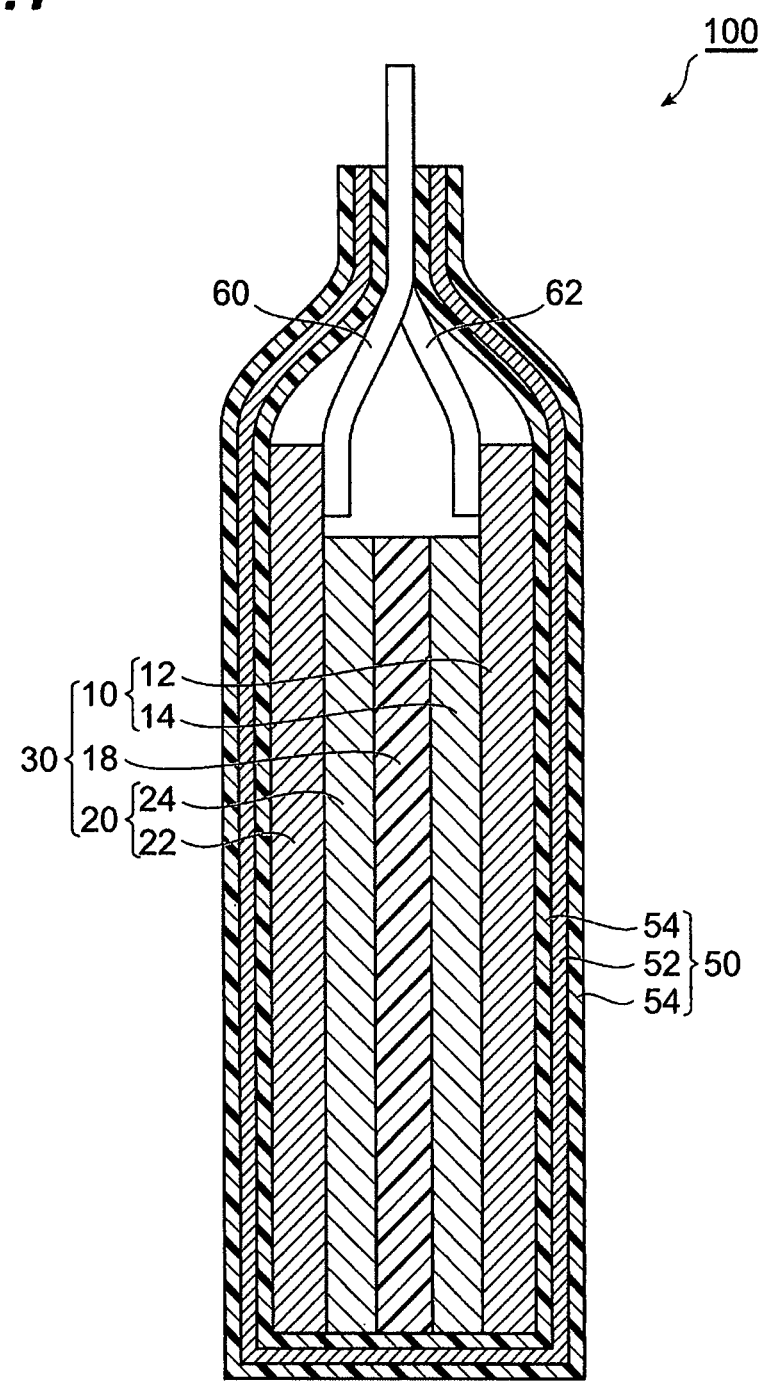
FIG. 1 is a simplified cross-sectional view for illustration of a lithium ion secondary battery as an electrochemical device according to an embodiment of the invention.

Preferred embodiments of the invention will now be explained in detail, with reference to the accompanying drawings. Throughout the explanation of the drawings, identical or corresponding elements will be referred to by like reference numerals and will be explained only once. The dimensional proportions in the drawings do not necessarily correspond to actual dimensional proportions.

(Electrochemical Device)

First, a lithium ion secondary battery will be explained with reference to FIG. 1, as an electrochemical device using an active material or electrode according to the invention.

The lithium ion secondary battery 100 is provided with a laminated body 30, a case 50 housing the laminated body 30 in a sealed state, and a pair of leads 60,62 connected to the laminated body 30.

The laminated body 30 is composed of a pair of electrodes 10, 20 laid facing each other and sandwiching a separator 18. The positive electrode 10 comprises a positive electrode active material layer 14 formed on a positive electrode collector 12. The negative electrode 20 comprises a negative electrode active material layer 24 formed on a negative electrode collector 22. The positive electrode active material layer 14 and negative electrode active material layer 24 are in contact with either side of the separator 18. The leads 60,62 are connected to the ends of the positive electrode collector 12 and negative electrode collector 22, and the ends of the leads 60,62 extend out from the case 50.

First Embodiment (Positive Electrode and Process for its Production)

A first embodiment of the invention will now be described. According to this embodiment, a surface-modified layer is formed on the surface of a positive electrode active material and the surface-modified positive electrode active material is used to form a positive electrode.

(Positive Electrode Active Material and Process for its Production)

First, a positive electrode active material powder is prepared as the starting material. According to this embodiment, a metal oxide is used as the positive electrode active material, and it is preferably an oxide containing Li and at least one metal selected from the group consisting Co, Ni and Mn, and for example, a lithium-containing metal oxide such as $LiMO_2$ (where M represents Co, Ni or Mn), $LiCo_xNi_{1-x}O_2$, $LiMn_2O_4$ or $LiCo_xNi_yMn_{1-x-y}O_2$ (where x and y are greater than 0 and less than 1), while it is more preferably $LiCo_xNi_yMn_{1-x-y}O_2$. When Ti is used as the metal of the metal fluorocomplex described hereunder, the metal oxide of the positive electrode active material used as the core section is preferably $LiCo_xNi_yMn_{1-x-y}O_2$ (where x and y are greater than 0 and less than 1), and when Zn is used as the metal of the metal fluorocomplex, the metal oxide of the positive electrode active material used as the core section is preferably $LiMn_2O_4$.

There are no particular restrictions on the particle size of the positive electrode active material powder, but it is preferably about 0.5-30 μm.

An aqueous solution containing a metal fluorocomplex is prepared next. The metal of the metal fluorocomplex may be titanium or zinc.

As specific metal fluorocomplexes there may be mentioned any one selected from the group consisting of fluorotitanic acid ($H_2TiF_6$), fluorotitanic acid salts and zinc fluoride ($ZnF_2$).

As fluorotitanic acid salts there may be mentioned potassium salts, calcium salts and ammonium salts, examples of which include $K_2TiF_6$, $CaTiF_6$ and $(NH_4)_2TiF_6$. For effective surface modification as described below, it is preferred to optimize the combination of the positive electrode active material and metal fluorocomplex. For example, when the positive electrode active material is $LiCo_xNi_yMn_{1-x-y}O_2$, the metal of the surface-modified layer not present in the core section is preferably Ti, and therefore $H_2TiF_6$, $K_2TiF_6$, $CaTiF_6$ or $(NH_4)_2TiF_6$ is preferably used. When the positive electrode active material is $LiMn_2O_4$, the metal of the surface-modified layer not present in the core section is preferably Zn, and therefore $ZnF_2$ is preferably used. In either case, it is preferred to use a fluorocomplex of a metal not present in the positive electrode active material.

The concentration of the metal fluorocomplex in the aqueous solution is preferably about 0.001 M-1 M.

The aqueous solution also preferably contains a scavenger that can withdraw fluoride ion ($F^-$) from the metal fluorocomplex. Addition of a scavenger can accelerate the surface modification.

As scavengers there may be used boric acid ($H_3BO_3$), aluminum (Al), $FeCl_2$, $FeCl_3$, NaOH, $NH_3$, Ti, Fe, Ni, Mg, Cu, Zn, Si, $SiO_2$, CaO, $B_2O_3$, $Al_2O_3$, MgO and the like.

The concentration of boric acid when it is used is preferably about 0.001 M-1 M in the aqueous solution.

The positive electrode active material powder is contacted with the aqueous solution containing the metal fluorocomplex. Specifically, the positive electrode active material powder is loaded into the metal fluorocomplex-containing aqueous solution, and stirring is carried out if necessary.

The following equilibrium reaction:

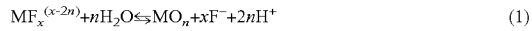
$$MF_x^{(x-2n)} + nH_2O \rightleftharpoons MO_n + xF^- + 2nH^+ \quad (1)$$

takes place in the aqueous solution, and when $H_3BO_3$ or Al is present as a scavenger, the following also take place:

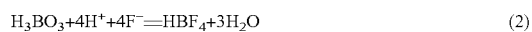
$$H_3BO_3 + 4H^+ + 4F^- = HBF_4 + 3H_2O \quad (2)$$

$$Al + 6H^+ + 6F^- = H_3AlF_6 + 3/2 H_2 \quad (3)$$

such that the equilibrium of equation (1) shifts to the right.

More specifically, boric acid reacts with fluoride ion as in equation (2), yielding $HBF_4$. Consumption of fluoride ion pushes the equilibrium of (1) to the right, thus promoting production of $MO_n$. Al also reacts with fluoride ion as in equation (3), yielding $H_3AlF_6$. As a result, the equilibrium is pushed in the direction of $MO_n$ production in equation (1).

Normally, shifting of the equilibrium in equation (1) to the right should form the simple oxide $MO_n$. However, when the procedure described above is carried out with an optimized combination of the positive electrode active material and metal fluorocomplex as according to the invention, the metal ion of the metal fluorocomplex dissolves on the surface of the positive electrode active material, thus forming a surface-modified layer wherein the metal element is dissolved as solid in the original positive electrode active material.

Figure 2:
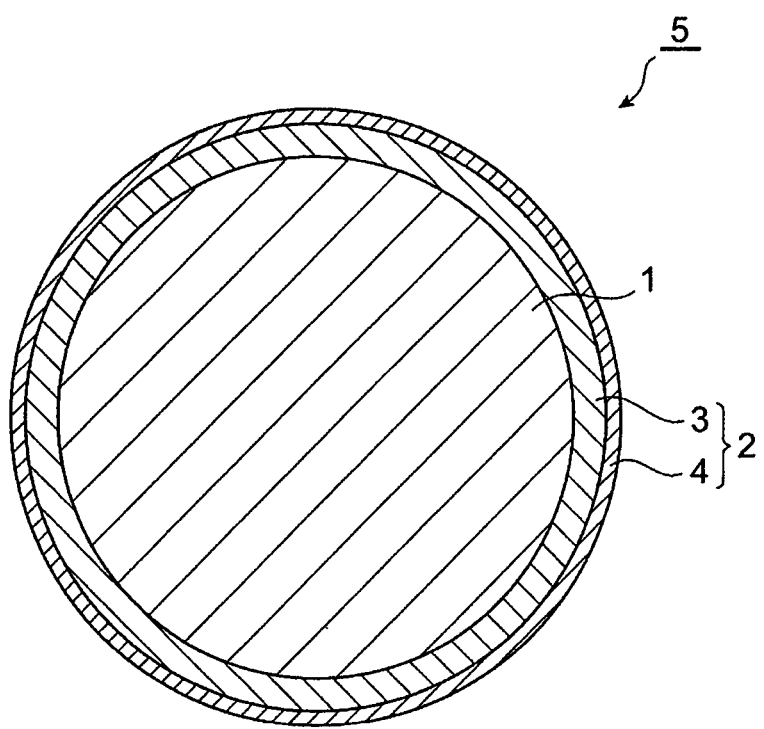
FIG. 2 is a simplified cross-sectional view of a surface-modified active material.

In other words, this treatment yields an active material 5 with a surface-modified layer 2 formed thereon, around a non-modified core section 1, as shown in FIG. 2. For example, the surface-modified layer 2 consists of an oxide containing metal fluorocomplex-derived metal atoms with the metal element in the metal oxide of the core section 1. Also, the surface-modified layer 2 is largely divided into two layers, the outer layer 4 being formed from the active material metal, the metal fluorocomplex metal and the fluorine-containing oxide, and the inner layer 3 being formed from the active material metal, the metal fluorocomplex metal and the non-fluorine-containing oxide. When the outer layer 4 contains almost no fluorine, the outer layer 4 may not be necessary, depending on the surface modification conditions.

For example, when the composition of the core section 1 is $LiCo_xNi_yMn_{1-x-y}O_2$ and the metal fluorocomplex is a titanium fluorocomplex, the outer layer 4 is formed of oxides containing Li, Co, Ni, Mn, Ti and F while the inner layer 3 is formed of oxides containing Li, Co, Ni, Mn and Ti but containing no F.

The surface-modified layer 2 is formed to completely cover the periphery of the core section 1, as shown in FIG. 1. There are no particular restrictions on the thickness of the surface-modified layer 2, and for example, it may be 1-200 nm and preferably 10-100 nm. The thickness of the surface-modified layer 2 can be easily controlled by appropriately adjusting the contact time between the active material powder and the aqueous solution, the temperature and the concentration of the metal fluorocomplex and scavenger.

The thickness of the outer layer 4 will usually be about 1-4 nm. The fluorine concentration of the outer layer 4 will generally be about 0.001 mol %-10 mol % with respect to the active material 5.

The content of the metal not present in the core section 1 is preferably 0.01 mol %-10 mol % with respect to the active material 5.

The number of moles of the active material 5 is calculated as (sum of the numbers of moles of each element not present in the core section 1+(total weight of elements other than those not present in the core section 1/molecular weight of the active material in the core section 1)). The composition of elements other than the elements not present in the core section can be slightly different from the composition of the core section 1, but this does not cause a problem because of the low concentration of elements not present in the core section.

When the metal oxide of the core section 1 is $LiCo_xNi_yMn_{1-x-y}O_2$, the content of metals in the surface-modified layer 2 not present in the core section 1 is preferably 0.1 mol %-70 mol % with respect to the total number of moles of Co, Ni, Mn and metals not present in the core section 1 in the surface-modified layer 2.

This treatment yields an active material 5 with a surface-modified layer 2 which is filtered to separate the aqueous solution from the active material, and then the active material is cleaned with water or the like and dried.

(Process for Production of Positive Electrode)

The active material 5 with the surface-modified layer is then used to form an electrode 10. First, a binder, collector 12 and conductive aid are prepared.

The binder is not particularly restricted so long as it can bind the active material and conductive aid to the collector, and any known binding material may be used. As examples there may be mentioned fluorine resins such as polyvinylidene fluoride (PVDF) and polytetrafluoroethylene (PTFE), and mixtures of styrene-butadiene rubber (SBR) with water-soluble polymers (carboxymethylcellulose, polyvinyl alcohol, sodium polyacrylate, dextrin, gluten, etc.).

The collector 12 is then prepared. Aluminum foil may be mentioned as a collector 12.

The conductive aid may be, for example, a carbon black or other carbon material, a metal powder such as copper, nickel, stainless steel, iron or the like, a mixture of a carbon material and a metal powder, or a conductive oxide such as ITO.

The surface-modified layer-bearing active material 5, the binder and the conductive aid are added to a solvent to prepare a slurry. The solvent may be, for example, N-methyl-2-pyrrolidone, N,N-dimethylformamide or the like.

The slurry containing the active material and binder is coated onto the surface of the collector 12 and dried to complete the positive electrode 10 comprising the positive electrode collector 12 and positive electrode active material layer 14 as shown in FIG. 1.

(Process for Production of Negative Electrode)

The negative electrode 20 may be formed by a known process. Specifically, a copper foil or the like may be used as the negative electrode collector 22, for example. The negative electrode active material layer 24 used may be one comprising a negative electrode active material, conductive aid and binder. The conductive aid and binder may be the same as used for the positive electrode.

As examples of negative electrode active materials there may be mentioned carbon materials such as graphite capable of occlusion/release (intercalation/deintercalation or doping/dedoping) of lithium ion, non-graphitizing carbon, graphitizing carbon, low-temperature firing carbon and the like, metals able to combine with lithium such as Al, Si and Sn, amorphous compounds composed mainly of oxides such as $SiO_2$ and $SnO_2$, and particles containing lithium titanate ($Li_4Ti_5O_{12}$).

The process for producing the negative electrode 20 may involve preparation of a slurry and coating of the collector in the same manner as the positive electrode 10 production process.

(Process for Production of Electrochemical Device)

An electrolyte solution, separator 18, case 50 and leads 60, 62 are also prepared in addition to the positive electrode and negative electrode.

The electrolyte solution infiltrates into the positive electrode active material layer 14, negative electrode active material layer 24 and separator 18. There are no particular restrictions on the electrolyte solution, and for this embodiment, for example, a lithium salt-containing electrolyte solution (an aqueous electrolyte solution or an electrolyte solution using an organic solvent) may be used. However, since an aqueous electrolyte solution has a low electrochemical decomposition voltage which limits the durable voltage when charging, it is preferred to use an electrolyte solution with an organic solvent (non-aqueous electrolyte solution). The electrolyte solution may be one dissolving a lithium salt in a non-aqueous solvent (organic solvent). Examples of lithium salts include salts such as $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$ and LiBOB. These salts may be used alone or in combinations of two or more.

As examples of organic solvents there may be mentioned propylene carbonate, ethylene carbonate and diethyl carbonate. These may also be used alone, or in combinations of two or more in any desired proportion.

According to this embodiment, the electrolyte solution may be a gelatinous electrolyte obtained by adding a non-liquid gelling agent. A solid electrolyte (a solid polymer electrolyte or an electrolyte composed of an ionic conductive inorganic material) may also be added instead of an electrolyte solution.

The separator 18 may be formed from an electrical insulating porous body, and for example, a monolayer or laminate film made of polyethylene, polypropylene polyolefin, a stretched film composed of a mixture of these resins, or a fiber nonwoven fabric composed of at least one type of material selected from the group consisting of cellulose, polyesters and polypropylene.

The case 50 has the laminated body 30 and electrolyte solution sealed within it. The case 50 is not particularly restricted so long as it can prevent leakage of the electrolyte solution to the exterior, and infiltration of moisture and the like from the exterior into the electrochemical device 100. For example, the case 50 may be a metal laminate film prepared by coating both sides of a metal foil 52 with a polymer film 54 as shown in FIG. 1. The metal foil 52 may be an aluminum foil, with a film of polypropylene or the like as a synthetic resin film 54. The material of the outer polymer film 54 is preferably a polymer with a high melting point such as polyethylene terephthalate (PET), polyamide or the like, and the material of the inner polymer film 54 is preferably polyethylene or polypropylene.

The leads 60, 62 are formed of a conductive material such as aluminum.

Employing a known method, the leads 60, 62 are welded to the positive electrode collector 12 and negative electrode collector 22, with the separator 18 sandwiched between the positive electrode active material layer 14 of the positive electrode 10 and the negative electrode active material layer 24 of the negative electrode 20, and after insertion in the case 50 together with the electrolyte solution, the opening of the case 50 is sealed.

An active material 5 with a surface-modified layer 2 is used in an electrochemical device according to this embodiment. Thus, loss of capacity is minimized even with repeated charging, so that the cycle characteristic is excellent. This is thought to be associated with at least inhibited degradation and deterioration of the electrolyte solution or electrolyte, inhibited active material crystal breakdown and improved thermostability of the active material, even during charging. Although the reason for this function and effect of the active material 5 of this embodiment is not clear, it is thought that the dissolved metal ion replaces a portion of the metal ion of the active material, resulting in conversion to a compound that inhibits decomposition of the electrolyte solution. In addition, a more satisfactory charge-discharge cycle characteristic is exhibited with high voltage charging, thereby allowing charging at higher voltage than by the prior art. This tendency is particularly notable with a metal oxide comprising lithium and metals other than lithium as the metal oxide of the core section, and especially with $LiCo_xNi_yMn_{1-x-y}O_2$.

Second Embodiment

A second embodiment of the invention will now be described. According to the invention, the active material powder prior to formation of the surface-modified layer 2 is used to form a positive electrode 10 comprising the positive electrode active material layer 14, and then the positive electrode 10 is contacted with an aqueous solution containing a metal fluorocomplex to form a surface-modified layer 2 on the surface of the positive electrode active material powder in the positive electrode active material layer 14. That is, the active material in the positive electrode active material layer 14 is modified.

The process for production of the positive electrode 10 is the same as the first embodiment, except that a non-surface-modified positive electrode active material powder is used. The aqueous solution containing the metal fluorocomplex to be contacted with the positive electrode 10 is also the same as the first embodiment. The conditions for contacting may also be the same as the first embodiment. If Al is used as the collector 12 of the positive electrode 10, the Al will act as a scavenger to promote surface modification. When an Al collector is used as a scavenger, the Al collector will become corroded, but not to a point impairing its function as a collector.

In this embodiment as well, treatment of the positive electrode modifies the surface of the active material in the active material layer in the same manner as the first embodiment, forming a surface-modified layer 2. As a result, the same effect as that of the first embodiment is achieved. (This completes explanation of the second embodiment.)

Although the surface of the positive electrode active material is modified in the embodiment described above, the same effect can be achieved by similar surface modification of the negative electrode active material, when the negative electrode active material is a metal oxide. For example, a significant effect is exhibited when the negative electrode active material is a metal oxide such as $Li_4Ti_5O_{12}$ or $SiO_x$ (x<2).

Furthermore, although this embodiment was explained for a secondary battery, a similar effect will be exhibited for an electrical double layer capacitor or a hybrid electrical double layer capacitor. For example, a notable effect can be achieved with an electrical double layer capacitor when $RuO_2$ or the like is used as the active material.

EXAMPLES

Examples A1-A6

For Examples A1-A6, $LiCo_{1/3}Ni_{1/3}Mn_{1/3}O_2$ was used as the positive electrode active material for surface treatment.

Example A1

Surface Modification of Positive Electrode Active Material with Titanium Fluorocomplex A 0.5 M $(NH_4)_2TiF_6$ (Kishida Chemical Co., Ltd.) aqueous solution and a 0.5 M $H_3BO_3$ (Kanto Kagaku Co., Ltd.) aqueous solution were prepared. After placing 4 ml of the 0.5 M $(NH_4)_2TiF_6$ aqueous solution and 20 ml of the 0.5 M $H_3BO_3$ aqueous solution in a plastic bottle, the total volume was brought to 200 ml by addition of water. This resulted in 0.01 M $(NH_4)_2TiF_6$ and 0.05 M $H_3BO_3$. The bottle was placed in a water bath and warmed to 30° C.-35° C. After loading 30 g of a positive electrode active material ($LiCo_{1/3}Ni_{1/3}Mn_{1/3}O_2$, Seimi Chemical Co., Ltd.) into the aqueous solution, treatment was performed for 20 minutes at 30° C.-35° C. while stirring with a magnetic stirrer.

The aqueous solution was filtered and the filtered solid was rinsed with water and dried at 100° C. The treated positive electrode active material was analyzed with a transmission electron microscope (STEM), revealing that the surface of the active material had a Ti-containing composition, i.e. it was covered with a surface-modified layer. A sample was prepared in the following manner. The sample was kneaded with an epoxy resin and cured on a board, and a portion of the resin-mixed sample was formed into a thin film (particle slices at a thickness of about 100 nm) by microsampling using a focused ion beam (FIB) system, and observed using an HD-2000 scanning transmission electron microscope (STEM) by Hitachi and a JEM-2100F scanning transmission electron microscope (STEM) by JEOL Corp. (200 kV). Compositional analysis was carried out using a microscope-attached EDS (energy dispersed X-ray spectrometer). The EDS data indicated that 100% of the surfaces of the active material particles were covered with a Ti-containing compound, and therefore the coverage factor was 100%. The coverage factor was determined by measuring the length of the outer perimeter of the core section 1 composed of $LiCo_{1/3}Ni_{1/3}Mn_{1/3}O_2$ and the length of the inner perimeter of the surface-modified layer 2 composed of a Ti-containing compound on the core section surface, and determining the ratio (%) of the length of the inner perimeter of the surface-modified layer 2 with respect to the length of the outer perimeter of the core section 1. It was found that the surface-modified layer composed of the Ti-containing compound exists as a film. Its film thickness is from a few to 200 nm, with an average thickness of 20 nm.

Chemical analysis of the entire active material to determine the amounts of Si, Ti, Zr, In, Sn and F produced the results shown in FIG. 4 and FIG. 5. FIG. 4 shows the weight percentages of Si, Ti, Zr, In, Sn, F and other elements (under the column "Balance") in the active material, and FIG. 5 shows the molar fractions of Si, Ti, Zr, In, Sn, F and other elements (under the column "Balance". The number of moles of the balance components were calculated based on the molecular weight of the positive electrode active material ($LiCo_{1/3}Ni_{1/3}Mn_{1/3}O_2$) of the core section) in the active material.

The F (fluorine) in FIG. 4 was measured by ion chromatography, while the other elements were measured by ICP. According to FIG. 5, the concentration of Ti was 0.275 mol %. Analysis by STEM and photoelectron spectroscopy revealed that fluorine was only present in the upper surface (several nm) of the surface-modified layer. This corresponds to the outer layer 4 of FIG. 2. The inner side of the fluorine-containing outer layer 4 is the inner layer 3 composed of Li—Co—Ni—Mn—Ti—O, and its inner side is the core section 1 composed of $LiCo_{1/3}Ni_{1/3}Mn_{1/3}O_2$. However, the amount of Li in the inner layer 3 was less than the amount of Li in the core section 1. According to a compositional analysis of the active material by STEM, the Ti content of the inner layer 3 differed depending on the location, but it was generally 0.4-58.9 mol % with respect to the total metal elements (Co, Ni, Mn, Ti) other than Li in the inner layer 3. The increase in Ti was clearly accompanied by a corresponding decrease in Mn and Ni. According to the results of compositional analysis of the core section, it was approximately Co:Ni:Mn=1/3:1/3:1/3. The metal composition of the outer layer 4 was similar to the inner layer 3.

Figure 6:
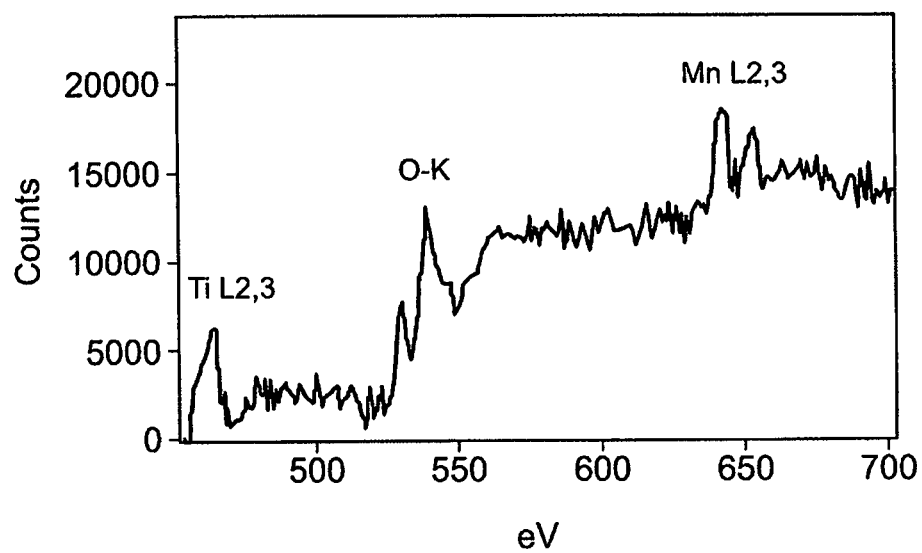
FIG. 6 shows EELS chart for the active material obtained in Example A1 at the inner layer.

Moreover, to examine whether Ti existed as solid solution or not, the inner layer 3 was analyzed by EELS (electron energy loss spectroscopy). According to the EELS, Ti, Mn, and O was detected in the inner layer. Therefore, it was found that Ti existed in solid solution state. The chart of EELS is shown in FIG. 6.

[Fabrication of Battery Electrodes]

Fabrication of Positive Electrode

A positive electrode was fabricated using the surface-modified positive electrode active material prepared earlier as the battery active material, CB (carbon black, DAB50 by Denki Kagaku Kogyo Co., Ltd.) and graphite (KS-6, Timcal) as conductive aids and PVDF (polyvinylidene fluoride, KF7305 by Kureha Corp.) as the binder. An NMP (N-methyl-2-pyrrolidinone) solution of the PVDF (KF7305) was added to the positive electrode active material, CB and graphite and mixed to prepare a coating material. The coating material was coated onto an aluminum foil collector (20 μm thickness) using the doctor blade method and then dried (100° C.) and rolled.

Fabrication of Negative Electrode

A negative electrode was fabricated using natural graphite as the battery active material, CB as the conductive aid and PVDF as the binder. The KF7305 was added to the natural graphite and CB and mixed to prepare a coating material. The coating material was coated onto a copper foil collector (16 μm thickness) using the doctor blade method and then dried (100° C.) and rolled.

[Fabrication of Battery]

The positive electrode and negative electrode fabricated earlier and a separator (polyolefin fine porous film) were cut to prescribed dimensions. In order to weld external leads to the positive and negative electrodes, sections uncoated with the electrode coating material (active material+conductive aid+binder) were left. The positive electrode, negative electrode and separator were laminated in that order. During lamination, a small amount of a hot-melt adhesive (ethylene-methacrylic acid copolymer, EMAA) was coated for anchoring to prevent sliding of the positive electrode, negative electrode and separator. The external leads for the positive and negative electrodes were aluminum foil (4 mm width, 40 mm length, 100 μm thickness) and nickel foil (4 mm width, 40 mm length, 100 μm thickness), ultrasonically welded. Maleic anhydride-grafted polypropylene (PP) was wrapped around the external leads and thermally bonded. This was done to improve sealing between the external leads and the outer casing. The battery outer casing encapsulating the battery element comprising the laminated positive electrode, negative electrode and separator included an aluminum laminate material, with the construction: PET (12)/Al(40)/PP (50). PET is polyethylene terephthalate and PP is polypropylene. The values in parentheses represent the thicknesses of each of the layers (units: μm). A sack was formed with PP on the inner side. The battery elements were placed in the outer casing, a suitable amount of electrolyte solution ($LiPF_6$ dissolved to 1 M in a mixed solvent of ethylene carbonate (EC) and diethyl carbonate (DEC) (EC:DEC=30:70 vol %)) was added, and the outer casing was vacuum sealed to prepare an electrochemical element (lithium ion secondary battery).

[Measurement of Electrical Characteristics]

The battery was charged to 4.5 V at 6.9 mA, and upon reaching 4.5 V, charging was continued until the current dropped to 0.345 mA. It was then discharged to 3.0 V at 6.9 mA. This cycle was repeated 300 times (cycle test). The test was conducted at 25° C. As shown in FIG. 3, the discharge capacity after 300 cycles was 84%, starting from an initial discharge capacity of 100%. The conditions and results are shown in FIG. 3.

Example A2

Active Material Heat Treatment after Surface Modification

A positive electrode active material that had been surface modified with a titanium fluorocomplex, prepared in Example A1, was heat treated in air at 500° C. for 2 hours. The heat treatment improved the crystallinity of the surface-modified layer. When the active material was analyzed by STEM and photoelectron spectroscopy in the same manner as Example A1, it was found to have the same structure as Example A1. According to a compositional analysis of the active material by STEM, the Ti content of the inner layer 3 was 0.4-17.6 mol % with respect to the total metal elements (Co, Ni, Mn, Ti) other than Li in the inner layer 3, although it differed depending on the location. According to the results of compositional analysis of the core section, it was approximately Co:Ni:Mn=1/3:1/3:1/3.

The previously prepared heat treated positive electrode active material was used to fabricate a positive electrode and battery in the same manner as Example A1, and the electrical characteristics were evaluated. The cycle test resulted in a discharge capacity of 85% after 300 cycles, starting from an initial discharge capacity of 100%.

Examples A3-A4

Active Material Heat Treatment 2, 3 after Surface Modification

Positive electrode active materials surface-modified with the Ti fluorocomplex, prepared in Example A1, were heat treated for 2 hours in air at 700° C. and 900° C.

The cycle test resulted in service capacities of 85% and 85%, respectively, after 300 cycles, starting from an initial discharge capacity of 100%.

Example A5

Alternative Surface Modification of Positive Electrode (Active Material-Containing Layer) with Titanium Fluorocomplex

[Preparation of Treatment Solution]

In a plastic container aqueous solution containing 0.01M of $H_2TiF_6$ and 0.05M of $H_3BO_3$ was made by dissolving them in water. Then, the solution was heated to 30-35° C.

[Fabrication of Battery Electrodes]

Fabrication of Positive Electrode $LiCo_{1/3}Ni_{1/3}Mn_{1/3}O_2$ (Seimi Chemical Co., Ltd.), CB, graphite (KS-6) and PVDF (KF7305) were used to fabricate a positive electrode. The KF7305 was added to the $LiCo_{1/3}Ni_{1/3}Mn_{1/3}O_2$, CB and graphite, and mixed to prepare a coating material. The coating material was coated onto an aluminum foil collector (20 μm thickness) using the doctor blade method and then dried and rolled.

[Treatment of Positive Electrode]

The previously prepared $H_2TiF_6$ aqueous solution was heated and the previously fabricated positive electrode was immersed therein for 20 minutes. After immersion, it was rinsed with distilled water and dried at 100° C. for 3 hours.

The previously prepared positive electrode, a negative electrode similar to Example A1 and a separator (polyolefin fine porous film) were used to fabricate a battery in the same manner as Example A1, and the electrical characteristics were evaluated. The cycle test resulted in a discharge capacity of 85% after 300 cycles, starting from an initial discharge capacity of 100%.

Comparative Example A1

A lithium ion secondary battery was fabricated in the same manner as Example A1, except that a non-surface-modified positive electrode active material ($LiCo_{1/3}Ni_{1/3}Mn_{1/3}O_2$, product of Seimi Chemical Co., Ltd.) was used. The cycle test resulted in a discharge capacity of 75% after 300 cycles, starting from an initial discharge capacity of 100%. The conditions and results are summarized in FIG. 3. Examples A1-A5 all had improved charge-discharge cycle characteristics compared to Comparative Example A1.

Example A6

A battery fabricated in the same manner as Example A4 was charged to 4.2 V at 6.9 mA, and upon reaching 4.2 V, charging was continued until the current dropped to 0.345 mA. It was then discharged to 3.0 V at 6.9 mA. This cycle was repeated 300 times (cycle test). The test was conducted at 25° C. As shown in FIG. 3, the discharge capacity after 300 cycles was 92%, starting from an initial discharge capacity of 100%.

Comparative Example A2

A battery fabricated in the same manner as Comparative example A1 was subjected to a cycle test evaluation in the same manner as Example A6. Starting from an initial discharge capacity of 100%, the discharge capacity after 300 cycles was 80%. The conditions and results are shown in FIG. 3. The charge-discharge cycle characteristic of Example A6 was superior to that of Comparative Example A2, even with the same upper limit for charging as the prior art.

Example B1

Surface Modification of Spinel-Type Lithium Manganate with Zn Fluorocomplex $LiMn_2O_4$ was used as the active material for Example B1. There were prepared a 0.05 M $ZnF_2.4H_2O$ (zinc fluoride tetrahydrate, product of Kanto Kagaku Co., Ltd.) aqueous solution and a 0.5 M $H_3BO_3$ (product of Kanto Kagaku Co., Ltd.) aqueous solution. After placing 40 ml of the 0.05 M $ZnF_2.4H_2O$ aqueous solution and 20 ml of the 0.5 M $H_3BO_3$ aqueous solution in a plastic bottle, the total volume was brought to 200 ml by addition of water. The $ZnF_2.4H_2O$ concentration was 0.01 M and the $H_3BO_3$ concentration was 0.05 M. The bottle was placed in a water bath and warmed to 30° C.-35° C. After then loading 30 g of a positive electrode active material (spinel-type lithium manganate, lithium, $LiMn_2O_4$) into the aqueous solution, it was treated for 20 minutes while stirring with a magnetic stirrer. The aqueous solution was filtered and the filtered product was rinsed with water and dried at 100° C., after which it was heat treated in air at 900° C. for 2 hours and then at 700° C. for 2 hours. The heat treatment at 900° C. improved the crystallinity of the surface-modified layer. However, heat treatment at 900° C. causes oxygen defects in $LiMn_2O_4$ and impairs the cycle characteristic. In order to prevent this, the heat treatment at 900° C. was followed by heat treatment at 700° C.

Next, a battery was fabricated in the same manner as Example A1 and charged to 4.2 V at 6.9 mA, and upon reaching 4.2 V, charging was continued until the current dropped to 0.345 mA. It was then discharged to 3.0 V at 6.9 mA. This cycle was repeated 300 times (cycle test). The test was conducted at 55° C. Starting from an initial discharge capacity of 100%, the discharge capacity after 300 cycles was 84%.

Comparative Example B1

A test battery was fabricated in the same manner as Example B1, except for using spinel-type lithium manganate ($LiMn_2O_4$) that had not been surface treated in any way, and evaluation was conducted under the same conditions as Example B1. Starting from an initial discharge capacity of 100%, the discharge capacity after 300 cycles was 70%. The conditions and results are shown in FIG. 3.

The charge-discharge cycle was improved in Example B1 compared to Comparative Example B1, even when using $LiMn_2O_4$ as the active material. It is also possible that Mn elution from the active material was inhibited.

What is claimed is:

1. An active material provided with:
    a core section composed of $LiCo_{1/3}Ni_{1/3}Mn_{1/3}O_2$ and
    a surface-modified layer covering the core section, wherein:
    the surface-modified layer has a first layer composed of an oxide containing a metal present in the core section, titanium, and fluorine;
    the fluorine is only present in an upper surface of the surface-modified layer;
    the upper surface of the surface-modified layer has a thickness of from 1 to 4 nm; and
    the surface-modified layer has a thickness of from 10 to 30 nm.

2. The active material according to claim 1, wherein a content of the titanium is 0.01 mol %-10 mol % with respect to the entire active material.

3. The active material according to claim 1, wherein:
a content of the titanium is 0.1 mol %-70 mol % with respect to a total number of moles of Co, Ni, and Mn in the surface-modified layer and the titanium.

4. An electrode comprising the active material according to claim 1.

5. A battery provided with an electrode comprising the active material according to claim 1.

6. The active material according to claim 1, wherein the surface-modified layer further has a second layer composed of an oxide containing a metal present in the core section and a metal not present in the core section, the second layer being between the core section and the first layer.

7. The active material according to claim 1, wherein the surface-modified layer is formed on a surface of $LiCo_{1/3}Ni_{1/3}Mn_{1/3}O_2$ by contacting an aqueous solution containing a metal fluorocomplex with $LiCo_{1/3}Ni_{1/3}Mn_{1/3}O_2$.

8. A process for production of the active material of claim 1, whereby an aqueous solution containing a metal fluorocomplex is contacted with $LiCo_{1/3}Ni_{1/3}Mn_{1/3}O_2$ to form a surface-modified layer on the surface of the $LiCo_{1/3}Ni_{1/3}Mn_{1/3}O_2$.

9. The process according to claim 8, wherein the metal fluorocomplex is at least one selected from the group consisting of fluorotitanic acid and fluorotitanic acid salts.

10. The process according to claim 1, wherein the aqueous solution containing the metal fluorocomplex further comprises a scavenger that chemically scavenges fluoride ion from the metal fluorocomplex.

11. The process according to claim 10, wherein the scavenger is boric acid or aluminum.

* * * * *